United States Patent
Blanchard et al.

(10) Patent No.: US 7,300,974 B2
(45) Date of Patent: Nov. 27, 2007

(54) RHEOLOGY REGULATORS SUCH AS GROUND NATURAL CALCIUM CARBONATES OPTIONALLY TREATED WITH A FATTY ACID OR SALT AND THEIR USE

(75) Inventors: Pierre Blanchard, Reyrieux (FR); Detlef Gysau, Zofingen (CH); Patrick Trouve, Clamart (FR); Henny Loman, deceased, late of Safenwil (CH); by Marion Loman-Oonk, legal representative, Almelo (NL)

(73) Assignee: OMYA AG, Oftringen (CH)

( * ) Notice: Subject to any disclaimer, the term of this patent is extended or adjusted under 35 U.S.C. 154(b) by 0 days.

(21) Appl. No.: 10/781,686

(22) Filed: Feb. 20, 2004

(65) Prior Publication Data

US 2004/0162376 A1    Aug. 19, 2004

Related U.S. Application Data

(63) Continuation of application No. 09/806,473, filed as application No. PCT/IB99/01625 on Oct. 1, 1999, now abandoned.

(30) Foreign Application Priority Data

Oct. 7, 1998   (FR)   .................................. 98 12714

(51) Int. Cl.
  *C08G 77/04*   (2006.01)
  *C08J 3/00*   (2006.01)
  *C08K 3/26*   (2006.01)
  *C08L 75/00*   (2006.01)
  *C08L 83/00*   (2006.01)

(52) U.S. Cl. .................... 524/588; 152/209 R; 241/16; 241/29; 523/200; 523/220; 524/425; 524/493; 524/495; 524/496; 524/588; 524/589; 524/590; 528/28

(58) Field of Classification Search ............ 152/209 R; 241/16, 29; 523/200, 220; 524/425, 493, 524/495, 496, 588, 589, 590; 528/28
See application file for complete search history.

(56) References Cited

U.S. PATENT DOCUMENTS

| 3,959,192 | A | | 5/1976 | Delfosse et al. | |
|---|---|---|---|---|---|
| 4,555,561 | A | * | 11/1985 | Sugimori et al. | ............. 528/26 |
| 5,015,669 | A | | 5/1991 | Aumann et al. | |
| 5,214,092 | A | | 5/1993 | Gloesener et al. | |
| 5,533,678 | A | | 7/1996 | Strauch et al. | |
| 5,896,904 | A | | 4/1999 | Ozaki et al. | |

FOREIGN PATENT DOCUMENTS

| DE | 44 00 566 | 7/1994 |
|---|---|---|
| DE | 197 39 475 | 3/1998 |
| EP | 0 384 609 | 8/1990 |

OTHER PUBLICATIONS

Hertz, Jr., Daniel L., "An analysis of Rubber Under Strain From An engineering Perspective", Elastomerics, Dec. 1991.*

* cited by examiner

*Primary Examiner*—Patrick Niland
(74) *Attorney, Agent, or Firm*—Oblon, Spivak, McClelland, Maier & Neustadt, P.C.

(57) ABSTRACT

The invention relates to the selection of a natural calcium carbonate crushed to a high degree of fineness, possibly treated with one or more fatty acids or one or more of their salts or mixtures thereof, and its use as a rheology regulator for polymeric compositions.

The specific surface area is 14 to 30 $m^2/g$ measured according to the BET method to ISO 4652, and the oil absorption is greater than 16 measured according to ISO 787-V (Rub-out method).

The conditions of mixing of the constituents and manufacture are improved, as well as the properties of the final product.

16 Claims, No Drawings

RHEOLOGY REGULATORS SUCH AS GROUND NATURAL CALCIUM CARBONATES OPTIONALLY TREATED WITH A FATTY ACID OR SALT AND THEIR USE

The present invention relates to the technical sector of sealants, coatings, adhesives; plastisols or rubbers.

There are known, in this field, polymeric compositions, with or without fillers, for example polyurethanes with a silane termination which are used as sealants or adhesives setting in moist conditions.

In the presence of moisture, terminal silane groups undergo, in a known manner, a hydrolysis and condensation reaction. A stable siloxane lattice (Si—O—Si) then forms.

Such products have many applications in various industrial fields such as the transport and building industries.

More and wore sophisticated formulations have therefore been sought, notably of the "single-component" type, capable of being applied to various substrates posing problems which are more and more difficult to resolve.

The composition of this type of formulation comprises one or more fillers, which can be one or more calcium carbonates normally referred to as "fine".

It has been discovered according to the invention that, surprisingly, the selection of a natural calcium carbonate ground to a high degree of fineness, which will be described below, or this calcium carbonate treated also as described below, makes it possible to achieve an unequalled set of satisfactory properties for the final product. These include notably good adaptability to adhesion on many types of substrate, such as certain difficult plastics, including without a prior primer coating called "primer", a reduction in the quantity of polymer required (and therefore a redaction in the cost of materials), or an appreciable reduction in the mixing time (which may reach a factor of ½ for each step, which has an obvious great economic advantage).

It is even more surprising to find that this remarkable improvement in a set of properties of the final product does not take place, as an expert would logically predict, to the detriment of the final mechanical properties, or properties such as resistance to chemical agents or UV radiation or similar properties conventionally required of such agents.

Formulations of the plastisol type based on polyvinyl chloride (PVC are also known.

It should be stated here that a plastisol designates a suspension of one or more PVC resins in a liquid plasticiser and additives such as mineral fillers, stabilisers, mineral and/or organic pigments, expansion agents, adhesion promoters, fluidifiers and others.

After thermal gelling, the plastisol takes the appearance of a more or less flexible compact mass.

One of the mineral fillers normally used consists of a synthetic calcium carbonate obtained chemically (precipitated calcium carbonate: PCC) such as for example the product Winnofil SPT Premium™ from Zeneca.

According to the invention, it is proposed to use, as a rheology regulating mineral material, a natural calcium carbonate crushed to a high degree of fineness whether or not with a dispersing agent present. This natural calcium carbonate is chosen from amongst chalk, calcite or marble, alone or in a mixture, or from amongst these same calcium carbonates treated by means of at least one fatty acid or its salt or a mixture thereof and preferentially using stearic acid or its salt, such as notably calcium, magnesium or zinc stearate and highly preferably using stearic acid or its calcium salt, the whole as described in more detail below.

The rheology regulator product according to the invention is characterised in that it is a case of a natural calcium carbonate, with a specific surface area of around 14 to 30 $m^2/g$, preferably 16 to 24 $m^2/g$ and highly preferentially around 20 $m^2/g$, measured according to the BET method to ISO 4652.

This carbonate is possibly treated with at least one fatty acid or its salt or a mixture thereof, an acid which is an acid containing 10 to 24 atoms of carbon, and more particularly stearic acid or its salt, such as notably calcium, magnesium or zinc stearate and highly preferentially by means of stearic acid or its calcium salt, preferably at the rate of 0-01% to 5% by weight and more preferentially 1% to 4% by weight.

It should be noted here that stearic acid means stearic acids of industrial quality composed mainly of 50% to 70% octadecanoic acid and 30% to 50% hexadecanoic acid.

An original advantage of the product according to the invention is that this product is a calcium carbonate which fulfils a rheology regulating function. This function is normally devolved to the polymers and additives contained in the polymeric formulation, such as for example viscosity depressors, and the Applicant was surprised to see it fulfilled by a product of the type consisting of a material with a natural mineral filler with a high degree of fineness.

The product selected according to the invention consists of a natural calcium carbonate crushed very finely with a dispersant present or not and possibly treated by means of at least one fatty acid or its salt or a mixture thereof.

Another of its characteristics lies in its oil absorption, which is greater than 16, measured according to ISO 787-V (Rub-out method).

A calcium carbonate with a specific surface area of 19 to 26 $m^2/g$ was described in the patent EP 0 795 588. It is known according to this document as a pigment giving brightness and opacity in the papermaking field. This field of application is totally different. In addition, such a function is completely different from that of a rheology regulating action, and nothing would suggest either the function brought to light by the invention, nor the fact that this novel application could lead to a surprising set of properties having a great economic advantage.

The invention also relates to the use, as a rheology regulator for the preparation of sealants or coatings, adhesives, plastisols or rubbers, of these natural calcium carbonates crushed to a very high degree of fineness, possibly treated by means of at least one fatty acid or its salt, notably of calcium, magnesium or zinc or a mixture thereof. This acid, which is an acid containing 10 to 24 atoms of carbon, is more particularly stearic acid or its salt, such as notably calcium, magnesium or zinc stearate and highly preferentially stearic acid or its calcium salt. The processing takes place preferably at the rate of 0.01% to 5% by weight and more preferentially 1% to 4% by weight of at least one fatty acid or its salt or a mixture thereof.

The invention also relates to the use of dispersions or suspensions, in an organic medium, of these calcium carbonates, treated or non-treated, as a rheology regulator for the preparation of sealants or coatings, adhesives, plastisols or rubbers.

The invention also relates to polymeric compositions of plastisols, sealant or coating, elastomer or rubber containing, as a rheology regulator, the said natural calcium carbonates crushed to a high degree of fineness, possibly treated by means of at least one fatty acid or its salt or a mixture thereof.

Other characteristics and advantages of the invention will be understood more clearly from a reading of the following description and examples. These examples should not be taken to represent any limitative aspect of the invention.

In the examples, the products have the following characteristics:

Product A:

A filler of the prior art, consisting of a natural calcium carbonate of the chalk type, crushed and dried, not treated, with a mean grain diameter of 0.67 micrometres measured by means of the Sedigraph 5100 from Micromeritics, with a specific surface area of 11 m²/g measured according to the BET method to ISO 4652.

Product B:

A rheology regulator according to the invention, consisting of a natural calcium carbonate of the chalk type, crushed and dried, not treated, with a mean grain diameter of 0.60 micrometres measured by means of the Sedigraph 5100 from Micromeritics, with a specific surface area of 19.5 m²/g measured according to the BET method to ISO 4652 and with an oil absorption of 18.75 measured according to ISO 787-V (Rub-out method).

Product C:

A rheology regulator according to the invention, consisting of a natural calcium carbonate of the Urgonian calcite type, crushed by the wet method and dried, not treated, with a mean grain diameter of 0.44 micrometres measured by means of the Sedigraph 5100 from Micromerifics, with a specific surface area of 16.5 m²/g measured according to the BET method to ISO 4652 and with an oil absorption of 20 measured according to ISO 787-V (Rub-out method).

Product D:

A rheology regulator according to the invention, consisting of a natural calcium carbonate of the chalk type, crushed by the wet method and dried, treated by the use of 3% by weight stearic acid, with a mean grain diameter of 059 micrometres measured by means of the Sedigraph 5100 from Micromeritics, with a specific surface area, after treatment, of 16 m²/g measured according to the BET method to ISO 4652 and with an oil absorption, after treatment, of 16.3 measured according to ISO 787-V (Rub-out method).

Product E:

A rheology regulator according to the invention, consisting of a natural calcium carbonate of the Urgonian calcite type, crushed by the wet method and dried, not treated, with a mean grain diameter of 0.58 micrometres measured by means of the Sedigraph 5100 from Micromeritics, with a specific surface area of 14.4 m²/g measured according to the BET method to ISO 4652 and with an oil absorption of 17.9 measured according to ISO 787-V ub-out method).

Product F:

A rheology regulator according to the invention, consisting of a natural calcium carbonate of the chalk type, crushed by the wet method and dried, treated by the use of 1% by weight stearic acid, with a resulting granulometry of 96%<1 micrometre and 39%<0.2 micometres measured by means of the Sedgaph 5100 from Micromeritics, with a specific surface area, after treatment, of 28 m²/g measured according to the BET method to ISO 4652 and with an oil absorption, after treatment, of 195 measured according to ISO 787-V (Rub-out method).

Product G:

A rheology regulator according to the invention, consisting of a natural calcium carbonate of the chalk type, crushed by the wet method and dried, not treated, with a specific surface area of 22 m²/g measured according to the BET method to ISO 4652 and an oil absorption of 19.4 measured according to ISO 787-V (Rub-out method).

Product H:

A filler of the prior art consisting of a precipitated calcium carbonate sold by Zeneca under the name Winnofil SPT™.

Product I:

A filler of the prior art, consisting of natural calcium carbonate of the chalk type, crushed by the wet method and dried, treated by means of 1% stearic acid, with a mean diameter of 1.4 micrometres measured by means of the Sedigraph 5100 from Micromeritics and with a specific surface area of 6 m²/g measured according to the BET method to ISO 4652.

Product J:

A filler of the prior art, consisting of a natural calcium carbonate of the chalk type, crushed by the wet method and dried, treated by the use of 1% by weight stearic acid, with a mean diameter of 1 micrometre measured by means of the Sedigraph 5100 from Micromeritics and a specific surface area of 10 rn/g measured according to the BET method to ISO 4652.

Product K:

A filler of the prior art consisting of a treated precipitated calcium carbonate sold by Solvay under the name Socal U1S2.

EXAMPLE 1

This example relates to the use of calcium carbonate as a rheology regulator for the preparation of plastisols.

In these tests, tests were carried out on the replacement of the synthetic calcium carbonate obtained by precipitation, of the prior art, or precipitated calcium carbonate (PCC), by the specific natural calcium carbonate according to the invention.

In a formulation of the plastisol type based on PVC (polyvinyl chloride) containing no calcium carbonate, it was sought to compare the effect of the replacement of 50% to 100% of the mineral filler normally used, namely a precipitated calcium carbonate, by a natural calcium carbonate crashed to a high degree of fineness according to the invention.

To do this, with 75 g of plastisol without filler, the calcium carbonate to be tested was mixed in a 7 cm diameter receptacle and the mixture was homogenised with a spatula. Then the mixture was put in dispersion for two minutes using a "Pendraulik"™ LD50 laboratory mixing appliance, the diameter of the dispersing disc being 5 cm, the speed of rotation of the disc being 2700 rev/min (manual setting at position 3).

The dispersing being terminated, the viscosity was measured by means of "Rheomat 120"™ equipment, a measuring appliance according to DIN 125, at 20° C.

Test N°1:

This test illustrates the prior art and uses 20 g of a precipitated calcium carbonate sold by Zeneca under the name Winnofil SPT™ (product H) and 5 g of natural calcium carbonate sold under the name Juraperle™ BS by Juraweiss.

Test N°2:

This test illustrates the prior art and uses 13 g of a precipitated calcium carbonate sold by Zeneca under the name Winnofil SPT™ (product H) and 12 g of product A according to the prior art.

Test N°3:

This test illustrates the invention and uses 25 g of product B according to the invention.

Test N°4:

This test illustrates the prior art and uses 20 g of a precipitated calcium carbonate sold by Zeneca under the name Winnofil SPT (product H).

Test N°5:

This test illustrates the invention and uses 10 g of a precipitated calcium carbonate sold by Zeneca under the name Winnofil SPT™ (product H) and 15 g of product D according to the invention.

Test N°6:

This test illustrates the invention and uses 10 g of a precipitated calcium carbonate sold by Zeneca under the name Winnofil SPT™ (product H) and 15 g of product C according to the invention.

Test N°7:

This test illustrates the invention and uses 13 g of a precipitated calcium carbonate sold by Zeneca under the name Winnofil SPT™ (product H) and 12 g of product E according to the invention.

Test N°8:

This test illustrates the invention and uses 10 g of a precipitated calcium carbonate sold by Zeneca under the name Winnofil SPT™ (product H), 5 g of natural calcium carbonate sold under the name Juraperle™ BS by Juraweiss and 10 g of product D according to the invention.

Test N°9:

This test illustrates the invention and uses 10 g of a precipitated calcium carbonate sold by Zeneca under the name Winnofil SPT™ (product H), 5 g of natural calcium carbonate sold under the name Juraperle™ BS by Juraweiss and 10 g of product E according to the invention.

Test N°10:

This test illustrates the invention and uses, for a mixture with 72 g of plastisol, 10 g of a precipitated calcium carbonate sold by Zeneca under the name Winnofil SPT™ (product H), 5 g of natural calcium carbonate sold under the name Juraperle™ BS by Juraweiss and 13 g of product E according to the invention.

The results of the viscosity measurements as a function of the speed of flow according to DIN 125 at 20° C. are set out in Tables Ia and Ib below.

TABLE Ia

| COMPOSITION | | TEST N° | | | | |
|---|---|---|---|---|---|---|
| | | Prior art 1 | Prior art 2 | Invention 3 | Prior art 4 | Invention 5 |
| | Plastisol without filler (in g) | 75.00 | 75.00 | 75.00 | 75.00 | 75.00 |
| | PCC (in g) | 20.00 | 13.00 | — | 25.00 | 10.00 |
| | Juraperle ™ BS (in g) | 5.00 | — | — | — | — |
| | Product A (in g) | — | 12.00 | — | — | — |
| | Product B (in g) | — | — | 25.00 | — | — |
| | Product D (in g) | — | — | — | — | 15.00 |
| | Weight of mixture (in g) | 100.00 | 100.00 | 100.00 | 100.00 | 100.00 |

| RHEOLOGY | Speed of flow s$^{-1}$ | Viscosity mPa · s | | | | |
|---|---|---|---|---|---|---|
| | | Test N° 1 | Test N° 2 | Test N° 3 | Test N° 4 | Test N° 5 |
| | 20 | 18200 | 17700 | 15200 | 17600 | 17100 |
| | 40 | 10040 | 9650 | 8430 | 9900 | 9650 |
| | 60 | 7260 | 7100 | 6280 | 7200 | 7100 |
| | 80 | 5890 | 5730 | 5170 | 5850 | 5700 |
| | 100 | 5100 | 4880 | 4390 | 5000 | 4800 |
| | 120 | 4490 | 4380 | 3980 | 4450 | 4350 |
| | 140 | 4100 | 4020 | 3550 | 3990 | 3990 |
| | 160 | 3780 | 3650 | 3310 | 3650 | 3650 |
| | 180 | 3460 | 3400 | 3110 | 3400 | 3380 |
| | 200 | 3320 | 3220 | 2950 | 3190 | 3170 |
| | 220 | 3140 | 3030 | 2780 | 3110 | 3000 |
| | 240 | 3000 | 2870 | 2620 | 2890 | 2820 |
| | 260 | 2870 | 2760 | 2520 | 2740 | 2700 |
| | 280 | 2760 | 2680 | 2420 | 2610 | 2600 |
| | 300 | 2660 | 2570 | 2350 | 2490 | 2490 |

TABLE Ib

| COMPOSITION | | TEST N° | | | | |
|---|---|---|---|---|---|---|
| | | Invention 6 | Invention 7 | Invention 8 | Invention 9 | Invention 10 |
| | Plastisol without filler (in g) | 75.00 | 75.00 | 75.00 | 75.00 | 72.00 |
| | PCC (in g) | 10.00 | 13.00 | 10.00 | 10.00 | 10.00 |
| | Juraperle ™ BS (in g) | — | — | 5.00 | 5.00 | 5.00 |

TABLE Ib-continued

|  | | | | | |
|---|---|---|---|---|---|
| Product C (in g) | 15.00 | — | — | — | — |
| Product D (in g) | — | — | 10.00 | — | — |
| Product E (in g) | — | 12.00 | — | 10.00 | 13.00 |
| Weight of mixture (in g) | 100.00 | 100.00 | 100.00 | 100.00 | 100.00 |

| | | Viscosity mPa · s | | | | |
|---|---|---|---|---|---|---|
| RHEOLOGY | Speed of flow s$^{-1}$ | Test N° 6 | Test N° 7 | Test N° 8 | Test N° 9 | Test N° 10 |
| | 20 | 12700 | 17300 | 13100 | 12500 | 17000 |
| | 40 | 7280 | 9450 | 7600 | 7160 | 9500 |
| | 60 | 5360 | 6950 | 5630 | 5250 | 7030 |
| | 80 | 4430 | 5600 | 4850 | 4330 | 5580 |
| | 100 | 3820 | 4830 | 4040 | 3780 | 4800 |
| | 120 | 3400 | 4230 | 3600 | 3300 | 4320 |
| | 140 | 3110 | 3950 | 2290 | 3000 | 3790 |
| | 160 | 2860 | 3550 | 3040 | 2770 | 3550 |
| | 180 | 2680 | 3260 | 2850 | 2590 | 3280 |
| | 200 | 2520 | 3110 | 2680 | 2480 | 3080 |
| | 220 | 2400 | 2910 | 2550 | 2320 | 2950 |
| | 240 | 2290 | 2790 | 2430 | 2200 | 2800 |
| | 260 | 2190 | 2670 | 2340 | 2130 | 2710 |
| | 280 | 2120 | 2580 | 2250 | 2050 | 2610 |
| | 300 | 2040 | 2490 | 2180 | 1970 | 2490 |

A reading of the table shows that the use of the calcium carbonate according to the invention makes it possible to regulate the rheological behaviour of the plastisol composition, even when 100% of the precipitated calcium carbonate has been replaced by the calcium carbonate according to the invention.

EXAMPLE 2

This example relates to the study of the conventional mechanical properties conferred by product F according to the invention, that is to say a natural chalk crashed so as to obtain a specific surface area of 28 m$^2$/g, on mixtures based on plasticised PVC, in comparison with mixtures filled by means of natural calcium carbonates well known in the prior art.

For each of these tests, the following mixture was produced:

| | |
|---|---|
| "SOLVIC 239 D" PVC sold by Solvay | 100 |
| Dioctyl phthalate (Jayflex ™ DOP from Exxon) | 50 |
| Dibasic lead sulphate | 1 |
| Tribasic lead sulphate | 2 |
| Filler to be tested | 80 |

Preparation of the Composition:

The dry mites or "dry blends" were prepared in a "GUEDU"™ adiabatic mixer at 100° C. for a period of 15 minutes. The mixtures were then gelled on cylinders at 150° C. in a mixing mill. For all the mixtures, this operation was performed in 12 minutes.

Sheets of 90×90×2 mm were then moulded at 160° C. after preheating of the blank for 3 minutes and pressurising for 2 minutes before cooling, using a compression press.

The test pieces necessary for determining the mechanical properties were cut from these sheets.

The different calcium carbonates tested were:

Test N°11:

This test illustrates the prior art and uses a natural chalk, treated with 1% stearic acid, with a specific surface area of 6 m$^2$/g measured according to the BET method to ISO 4652 (product I).

Test N°12:

This test illustrates the prior art and uses a natural chalk, treated with 1% stearic acid, with a specific surface area of 10 m$^2$/g measured according to the BET method to ISO 4652 (product J).

Test N°13:

This test illustrates the invention and uses product F according to the invention.

The mechanical properties were assessed by means of dynamometric tests (tensile strength, breaking elongation, modulus 100%) carried out using the Instron™ equipment according to ISO 37, at a temperature 23° C. and with a traction speed of 10 cm/min.

The ASTM-C tear strength was for its part determined according to the method of ISO R-34 and Shore C hardness according to the method of ISO 868.

The results of these measurements of mechanical properties are set out in Table II below.

TABLE II

| Test N° | Prior art 11 | Prior art 12 | Invention 13 |
|---|---|---|---|
| Tensile strength (daN/cm$^2$) | 128 | 130 | 136 |
| Breaking elongation (%) | 300 | 260 | 172 |
| Modulus 100% (daN/cm$^2$) | 83 | 106 | 127 |
| ASTM-C tear strength (daN/cm) | 47 | 56 | 58 |
| Shore C hardness at 15 s (in daN/cm) | 60 | 64 | 74 |

It can be seen that the mechanical properties obtained are excellent and are superior to those obtained with natural calcium carbonates which are crushed but which have a specific surface area outside the scope of the invention.

The invention therefore makes it possible to optimise the formulations according to the mechanical property to be favoured.

EXAMPLE 3

This example relates to the use of calcium carbonates as a rheology regulator for the preparation of elastomer based on natural or synthetic rubber.

It was sought in this example to assess the effect of the specific surface area of a crashed natural chalk according to the invention on the properties of mixtures based on natural and synthetic rubbers, in comparison with a precipitated calcium carbonate of the prior art.

To do this, for each of Tests 14 and 15, the following mixture was produced:

| | |
|---|---|
| Natural rubber (smoked sheet quality RSS 1) | 100 |
| SBR rubber (styrene-butadiene, Cariflex ™ 1502 from Shell) | 40 |
| Zinc oxide (snow quality) from Vieille Montagne | 5 |
| Stearic acid | 2 |
| Sulphur | 1.5 |
| N-cyclohexyl 2 benzothiazyl sulphenamide (Vulcafor ™ CBS from Vulnax) | 1 |
| Tetramethyltbiuram disulphide (Vulkacit ™ DTMT from Bayer) | 0.5 |
| Calcium carbonate to be tested | 100 |

Test N°14:

This test illustrates the prior art and uses a precipitated calcium carbonate sold by Solvay under the name Socal U1S2 (product K).

Test N°15:

This test illustrates the invention and uses product F according to the invention.

These two tests were carried out as follows:

A pure gum master-batch was prepared, by the successive incorporation of the various ingredients, except for calcium carbonate, according to the normal technique of experts, on a mixing mill regulated for temperature, by mixing for 10 minutes (friction I/I,4) at 60° C.

From this master-batch two samples were taken in which the calcium carbonates to be tested had been incorporated, by mixing at 60° C. for 12 minutes.

After determination of the vulcanisation optima at 155° C. using a Monsanto flow meter, sheets were moulded and vulcanised to this optimum in order to effect the measurement of the mechanical properties according to the same operating method as in the previous tests.

The results of the mechanical properties are set out in Table III below.

TABLE III

| Test N° | Prior art 14 | Invention 15 |
|---|---|---|
| Vulcanisation optimum at 155° C. | 5 min. 15 s | 5 min. |
| Tensile strength daN/cm$^2$ | 119 | 109 |
| Modulus 300% daN/cm$^2$ | 41 | 39 |
| Elongation % | 500 | 485 |
| Tear strength ASTM-C daN/cm | 23 | 26 |
| Shore A hardness (15 s) | 61 | 61 |

It can be seen that the product according to the invention reduces the implementation time (the vulcanisation optimum) as well as the tear strength properties.

Likewise Tests 16, 17 and 18 were carried out using the following formulation:

| | |
|---|---|
| SBR rubber (styrene-butadiene, Cariflex ™ 1502 from Shell) | 40 |
| Natural rubber (smoked sheet quality RSS 1) | 60 |
| Zinc oxide (snow quality) from Vieille Montagne | 5 |
| Stearic acid | 2 |
| Sulphur | 2 |
| N-cyclohexyl 2 benzothiazyl sulphenamide (Vulcafor ™ CBS from Vulnax) | 0.9 |
| Diorthotolylguanidine accelerator (Vulkafor ™ DOTG from Vulnax) | 0.3 |
| Calcium carbonate to be tested | 100 |

Test N°16:

This test illustrates the prior art and uses a precipitated calcium carbonate sold by Solvay under the name Socal U1S2 (product K).

Test N°17:

This test illustrates the prior art and uses a calcium carbonate of the chalk type, crushed by the wet method and dried, treated, with a mean diameter of 1.4 micrometres measured by means of the Sedigraph 5100 from Micromeritics and with a specific surface area of 10 m$^2$/g measured according to the BET method to ISO 4652 (product J).

Test N°18:

This test illustrates the invention and uses product G according to the invention.

From this master batch manufactured with the same operating method as in the previous test, three samples were taken in which the calcium carbonates to be tested bad been incorporated, by mixing at 60° C. for 12 minutes. After determination of the vulcanisation optima, sheets were moulded and vulcanised to this optimum in order to effect a measurement of the mechanical properties according to the same operating method as for the previous tests.

The results of the mechanical properties are set out in Table IV below.

TABLE IV

| Test N° | Prior art 16 | Prior art 17 | Invention 18 |
|---|---|---|---|
| Vulcanisation optimum at 150° C. | 23 min. 30 s | 16 min. 45 s | 11 min. |
| Tensile strength (daN/cm$^2$) | 122 | 132 | 132 |
| Modulus 300% (daN/cm$^2$) | 16.5 | 20 | 20 |
| Elongation % | 695 | 715 | 695 |
| ASTM-C tear strength (daN/cm) | 23 | 28 | 28 |
| Shore A hardness (15 s) in (daN/cm) | 51 | 50 | 50 |

It can be seen that the product according to the invention improves the implementation time (the vulcanisation optimum) and the majority of the mechanical properties.

EXAMPLE 4

A second series of tests (Tests 19 and 20) were carried out in a natural rubber 40 per filled with a mineral filler with the basic formula:

| | |
|---|---|
| Natural rubber (smoked sheet quality RSS 1) | 100 |
| Coumarone resin 60/70 | 5.6 |
| Rosin | 3 |
| Zinc oxide (snow quality) from Vieille Montagne | 40 |

-continued

| | |
|---|---|
| Stearic acid | 0.5 |
| Oil | 4.3 |
| Benzothiazyl disulphide accelerator (Vulcafor™ MBTS from Vulnax) | 1 |
| Diphenylguanidine accelerator (Vulcafor™ DPG from Vulnax) | 0.36 |

The calcium carbonates to be tested were:

Test N°19:

A precipitated calcium carbonate (product K) for this test, which illustrates the prior art.

Test N°20:

A natural calcium carbonate according to the invention product G) for this test, which illustrates the invention, The results of the mechanical properties, measured with the same operating method as for the following tests, are set out in Table V below.

TABLE V

| Test N° | Prior art 19 | Invention 20 |
|---|---|---|
| Vulcanisation optimum at 150° C. | 7 min. 15 s | 8 min. 15 s |
| Tensile strength (daN/cm²) | 246 | 246 |
| Modulus 300% (daN/cm²) | 32 | 31 |
| Elongation % | 710 | 710 |
| Shore A hardness (15 s) in (daN/cm) | 45 | 46.5 |

It can be seen that the product according to the invention makes it possible to obtain equivalent mechanical property results, even by completely replacing the precipitated calcium carbonate with a natural calcium carbonate.

The invention claimed is:

1. A sealant or coating or adhesive which comprises a rheology regulator comprising a natural calcium carbonate, crushed to a high degree of fineness, with a specific surface area of around 14 to 30 m²/g measured according to the BET method to ISO 4652, wherein when 50-100% of a precipitated calcium carbonate present in a polyvinyl chloride-based plastisol is replaced with said rheology regulator, and said plastisol is subjected to a viscosity test according to DIN 125 at 20° C., the viscosity at 300 s⁻¹ is less than the viscosity obtained for the plastisol containing said precipitated calcium carbonate, and which rheology regulator further comprises a polyurethane with terminal silane groups and a plasticiser of the phthalate type.

2. The sealant or coating or adhesive according to claim 1, wherein the natural calcium carbonate, crushed to a high degree of fineness, has a specific surface area of 14.4 m²/g, measured according to the BET method to ISO 4652.

3. The sealant or coating or adhesive according to claim 1, wherein the natural calcium carbonate, crushed to a high degree of fineness, has a specific surface area of 16 m²/g, measured according to the BET method to ISO 4652.

4. The sealant or coating or adhesive according to claim 1, wherein the natural calcium carbonate, crushed to a high degree of fineness, has a specific surface area of 16.5 m²/g, measured according to the BET method to ISO 4652.

5. The sealant or coating or adhesive according to claim 1, wherein the natural calcium carbonate, crushed to a high degree of fineness, has a specific surface area of 22 m²/g, measured according to the BET method of ISO 4652.

6. The sealant or coating or adhesive according to claim 1 wherein the natural calcium carbonate, crushed to a high degree of fineness, has a specific surface area of 28 m²/g, measured according to the BET method to ISO 4652.

7. The sealant or coating or adhesive according to claim 1, wherein the natural calcium carbonate is treated with at least one fatty acid containing 10 to 24 atoms of carbon or its salt selected from the group consisting of calcium salt, magnesium salt, zinc salt and a mixture thereof in a proportion of around 0.0 1% to 5% by weight.

8. The sealant or coating or adhesive according to claim 7, wherein the natural calcium carbonate is treated with at least one fatty acid containing 10 to 24 atoms of carbon or its salt selected from the group consisting of calcium salt, magnesium salt, zinc salt, and a mixture thereof in a proportion of around 1% to 4% by weight.

9. The sealant or coating or adhesive according to claim 1, wherein the rheology regulator has an oil absorption which is greater than 16 measured according to ISO 787-V (Rub-out method).

10. The sealant or coating or adhesive according to claim 1, which further comprises one or more additives selected from the group consisting of smoked silica as a thixotropic agent, a bleaching agent, a UV stabilizer, an adhesion promoter, a catalyst, and a dehydrating agent.

11. The sealant, coating or adhesive according to claim 1, which is prepared by a method comprising adding natural calcium carbonate, crushed to a high degree of fineness, with a specific surface area of around 14 to 30 m²/g measured according to the BET method to ISO 4652 to a sealant, a coating, or an adhesive, respectively, in an amount to regulate the rheology of said sealant, coating, or adhesive.

12. The sealant, coating or adhesive of claim 11, which further comprises one or more additives selected from the group consisting of smoked silica as a thixotropic agent, a bleaching agent, a uv stabilizer, an adhesion promoter, a catalyst, and a dehydrating agent.

13. The sealant or coating or adhesive according to claim 1, wherein the natural calcium carbonate has a specific surface area of 16 to 24 m²/g measured according to the BET method to ISO 4652.

14. The sealant or coating or adhesive according to claim 1, wherein the natural calcium carbonate has a specific surface area of about 20 m²/g measured according to the BET method to ISO 4652.

15. The sealant or coating or adhesive according to claim 7, wherein the natural calcium carbonate is treated with stearic acid or its calcium salt.

16. The sealant or coating or adhesive according to claim 8, wherein the natural calcium carbonate is treated with stearic acid or its calcium salt.

* * * * *